Patented Nov. 5, 1940

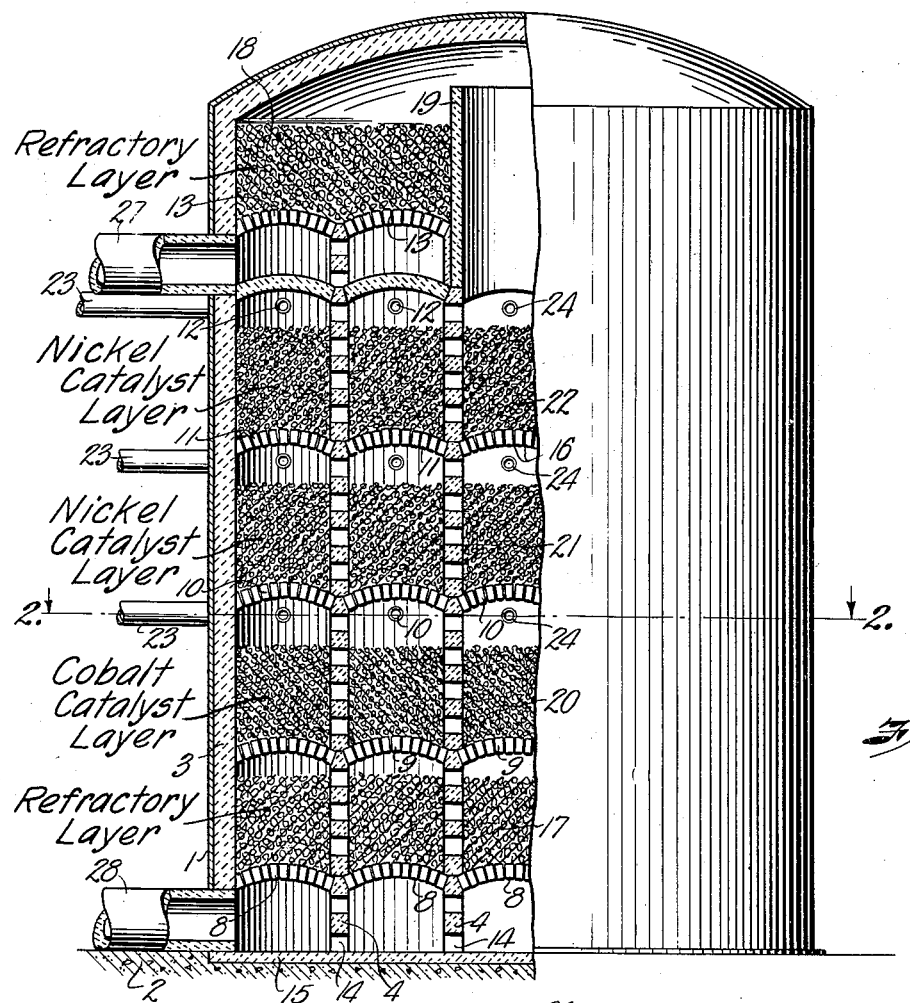

2,220,849

UNITED STATES PATENT OFFICE 2,220,849

METHOD FOR FORMING SYNTHESIS GAS

Earl W. Riblett, Teaneck, N. J., assignor to The M. W. Kellogg Company, New York, N. Y., a corporation of Delaware Application August 29, 1938, Serial No. 227,232

5 Claims. (Cl. 23—5)

My invention relates to a method and apparatus for forming synthesis gas and more particularly to a method of converting a mixture of methane and carbon dioxide or methane and water vapor to mixtures of carbon monoxide and hydrogen suitable for use in various processes of synthesizing organic compounds.

A mixture of carbon monoxide and hydrogen may be made from natural gas (methane) and carbon dioxide, according to the following reaction:

$$CH_4 + CO_2 \rightarrow 2CO + 2H_2 - x \text{ calories}$$

The above reaction takes place in the presence of a catalyst at temperatures between 1500° F. and 2000° F. This reaction may be used with a similar reaction where steam is used:

$$CH_4 + H_2O \rightarrow CO + 3H_2$$

The advantage of the two reactions over either when used alone is obvious since only by a combination of the two reactions can the optimum ratio of carbon monoxide (CO) to hydrogen (1:2) be obtained directly from natural gas:

$$3CH_4 + 2H_2O + CO_2 \rightarrow 4CO + 8H_2$$

The catalyst usually employed for this purpose consists of nickel deposited upon some temperature-resistant support. This catalyst serves quite well for the conversion of gases substantially free of sulphur or its compounds. When, however, it is used in connection with gases containing sulphur or its compounds, nickel sulphide is formed by the interaction of the sulphur present with the nickel in the catalyst. At the temperatures used in the conversion of methane and carbon dioxide into hydrogen and carbon monoxide, that is in the neighborhood of 1700° F., the nickel sulphide is molten since it melts at about 1470° F. The molten nickel sulphide tends to flow in the direction of the flow of the gas stream. It will be obvious that this is highly undesirable for not only does it remove the nickel catalyst from the support in the first part of the reaction vessel, but the molten nickel sulphide tends to react with fresh nickel as it flows along the reaction vessel forming solid nickel subsulphide in accordance with the following reaction:

$$NiS + Ni \rightarrow Ni_2S$$

The solid nickel sulphide plugs the reaction vessel in a short time so that the flow of gases is impeded or stopped entirely.

When the reaction vessel is not completely blocked but will still allow the passage of small amounts of gases, the nickel subsulphide may be oxidized with oxygen of the air to nickel oxide and sulphur dioxide. This oxidation process, however, is very slow due to the time required for the burning through of the large aggregates of nickel subsulphide. Then, too, there is a further disadvantage in that the nickel oxide formed is in the form of very fine particles which sift to the bottom of the reaction vessel. This not only results in very poor distribution of the nickel catalyst but the fine powder offers such resistance to the flow of gases that the nickel powder is not of service for the conversion reaction. In time, the fine powder will build up sufficiently to stop the flow of gases and necessitate a shut down of the process.

The formation of nickel sulphide takes place largely in the first part of the reaction chamber since it is only in this portion of the reaction chamber that the incoming gases contain sulphur or its compounds, that is, such sulphur as is present will be removed from the gas upon its first contact with the nickel. As time goes on, the sulphide formation gradually progresses through the reaction vessel, the extent of the progress, of course, being determined by the rate of flow of the gases, the total sulphur content of the gases, and the time of operation before the reaction vessel becomes clogged. It is possible to calculate for specific conditions the extent to which the sulphide formation has taken place. These calculations may be verified by experiment.

One object of my invention is to provide a method of converting mixtures of carbon dioxide and methane or water gas and methane into synthesis gas mixtures containing carbon monoxide and hydrogen in a continuous manner irrespective of the presence of sulphur or its compounds in the incoming gases.

Another object of my invention is to provide a novel synthesis chamber for the formation of synthesis gas from mixtures of methane and carbon dioxide, or methane and water vapor.

Other and further objects of my invention will appear from the following description:

In the accompanying drawing which forms part of the instant specification and are to be read in conjunction therewith and in which like reference numerals are used to indicate like parts in the various views;

Figure 1 is an elevation, with parts in section, of a regenerator and catalyst chamber capable of carrying out the method of my invention.

Figure 2 is a sectional view taken on a line 2—2 of Figure 1.

Cobalt is a very similar metal to nickel in its ability to promote the conversion of methane and carbon dioxide into hydrogen and carbon monoxide. It has the advantage over nickel in that cobalt sulphide will remain solid at the temperatures of the conversion, that is around 1700° F. since its melting point is above 2000° F. Cobalt, however, is much more expensive than nickel.

In accordance with the instant invention, I employ cobalt deposited upon a suitable support in the forepart of the reaction vessel, that is that part of the reaction vessel in which the incoming gases are first converted while employing nickel upon a suitable support in the after part or remainder of the reaction vessel. This has proved to be a very efficacious arrangement for catalysts and does away entirely with the loss of metal from the support. No plugging of the reaction vessel takes place and the duration of the operating cycle is very appreciably increased.

In the practice of the invention it is contemplated that metals such as iron, molybdenum, or any other metals with sulphides of a sufficiently high melting point and giving similar results, may be used in place of cobalt.

I have found that it is advantageous to operate upon the conversion part of the cycle until substantially all of the cobalt has been converted into sulphide and before any appreciable amount of nickel has been converted into sulphide. When this point of the operation is reached, I stop the conversion cycle and pass in oxygen, together with flue gas, until all the cobalt sulphide which has been formed in the conversion part of the cycle has been burned to cobalt oxide and sulphur dioxide. The sulphur, of course, is thus removed from the system in the form of gaseous sulphur dioxide, leaving the cobalt oxide behind. Likewise, any carbon which may have been deposited upon the catalyst will be removed as oxides of carbon. The metal oxides are then reduced to the metal by the reducing methane contained in the gases to be converted. If desired, I may reduce the cobalt oxide by means of hydrogen before admitting the mixture of carbon dioxide and methane.

All of the above operations may be readily carried out at temperatures varying between 1200° and 2000° F., a temperature of around 1700° F. being preferred for the conversion part of the cycle.

From the foregoing, the operation of my method will be clear to those skilled in the art. It will be understood that the thickness of the initial cobalt bed will depend upon many factors, chiefly upon the amount of sulphur or its compounds in the incoming gas. The make cycle or the conversion portion of the run can be continued only until the temperature of the reaction chamber drops below an efficient conversion temperature say about 1500° F. The thickness of the cobalt bed should be such that for the length of time the process is on the conversion cycle, the sulphide formation will not progress past the cobalt layer to the nickel layer. The gas supply for any given installation will not vary widely in total sulphur content. From the total sulphur in the gas and the rate at which the gas is required for use, the minimum fraction of the total conversion catalyst which must be cobalt, can be readily calculated. An additional quantity of cobalt may be used as a factor of safety if desired.

Referring now to Figure 1, a cylindrical steel shell 1 may be formed in any suitable manner and mounted upon a suitable foundation 2. The interior of the steel shell is lined with a refractory material such as firebrick 3 and is provided with a floor 15 of refractory material. A plurality of walls 4 are housed within the casing 1 and support arches 8, 9, 10, 11, 12, and 13, as can readily be seen by reference to Figure 1. The walls are provided with interstices or passages 14, which permit horizontal flow of the gases. The arches 8, 9, 10, 11 and 13 are made of refractory matter such as fire brick and are provided with interstices 16 permitting vertical flow of the gases therethrough. The arches 12 are likewise made of refractory material and are refractory.

A flue 19 of refractory material provides communication between the spaces within the chamber on opposite sides of the imperforate arches 12. A mass of refractory material such as crushed firebrick 17 is supported upon arches 8 and a mass of crushed firebrick forming a refractory layer 18 is supported upon arches 13, the flue 19 extending through this last mass of crushed firebrick.

The arches 9 support a layer of cobalt catalyst 20 comprising cobalt deposited upon a refractory support of any suitable character such as silica or the like. The thickness of this layer has been calculated as pointed out above. Layers 21 and 22 comprise nickel catalysts deposited upon suitable refractory supports.

Extending into the housing 1 above the imperforate floor formed by arches 12, is a duct 27 formed of refractory material. Extending into the interior of the chamber 8 adjacent the lower portion thereof, is a duct 28 made of refractory material. Manifolds 23 are provided with pipes 24 extending into the chamber at a plurality of places therein.

In operation, air is introduced through duct 27 flowing upwardly through the interstices of arches 13 through the bed of refractory material 18, downwardly through flue 19 from which it is disseminated through catalyst masses 22, 21 and 20, flowing downwardly therethrough. Fuel gas is introduced into manifolds 23 for combustion, through the catalyst masses, the air being supplied through duct 27 for supporting the combustion. The hot gases of combustion pass downwardly through the catalyst mass 22, 21 and 20, and thence through refractory mass 17 and out through duct 27. The construction of the fuel inlets 24 is such that the fuel is disseminated through the catalyst masses preventing local overheating. The entire mass is then heated to the desired temperature in the vicinity of 1700° F.

It will be noted that the incoming air passes through the uppermost refractory mass 18, thus cooling this mass and being itself heated before combining with the fuel gas for combustion. The combustion gases pass outwardly in contact with refractory mass 17, thus storing the heat therein.

During the make cycle, a mixture of carbon dioxide and methane is introduced through duct 28. The mixture will flow through the hot refractory bed 17 and be brought to the reaction temperature. Heat for the reaction is also furnished from the heated catalyst masses 20, 21 and 22. The hot synthesis gas, after being formed, passes upwardly through flue 19 and downwardly through refractory mass 18. Refractory mass 18 will thus become heated and the freshly heated synthesis gas will be cooled and flow upwardly through duct 27.

It will be observed that the sulphur and sulphur containing compounds present in the gases being charged will first contact the cobalt or other metallic layer of catalyst so that the gases contacting the upper and subsequent nickel catalyst layers will be substantially desulphurized.

A typical example of an operation with a converter of this character will be given for purposes of illustration and not by way of limitation. The catalyst chamber contained about 1638 cubic feet of catalyst material, consisting of nickel and cobalt deposited on refractory material in a concentration of 3.3 pounds of metal per cubic foot of refractory. The regenerator was operated on 7-minute cycles, of which 3.5 minutes were spent during synthesis gas make and 3.5 minutes in the blasting portion of the cycle. Such a chamber could produce about 15,000,000 cubic feet of synthesis gas per day from approximately 5,000,000 cubic feet of natural gas. When the natural gas contained 100 grains of sulphur per 100 cubic feet, it would be necessary to remove about 3.5 pounds of sulphur per cycle. Theoretically this would require only 6.5 pounds of cobalt, but actually, due to the difficulty of contacting the relatively small amount of sulphur in the large amounts of gas with the cobalt, much more cobalt has been found necessary. In this example, the catalyst was distributed in three layers, two upper layers of nickel contact containing the bulk of the catalyst mass and a lower layer of cobalt contact containing 500 pounds of cobalt. These arrangements and quantities were found to be very efficacious, and the synthesis gas thus produced contained sulphur in such small amounts that it could be passed to the synthesis step without further purification.

It will be observed that I have accomplished the objects of my invention. I have provided a method of forming synthesis gas and apparatus therefor which will prevent displacement of the catalyst by the presence of sulphur and sulphur containing compounds in the incoming charge.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of converting methane and carbon dioxide into hydrogen and carbon monoxide including the steps of flowing a mixture of methane and carbon dioxide through a conversion zone and there contacting the gaseous mixture at a temperature in the vicinity of 1700° F., first with a cobalt catalyst and then with a nickel catalyst, both catalysts promoting the formation of hydrogen and carbon monoxide, and the cobalt catalyst contacting step being of sufficient duration to substantially remove sulphur and sulphur containing compounds from the incoming gases.

2. A method of converting methane and carbon dioxide into hydrogen and carbon monoxide including the steps of flowing a mixture of methane and carbon dioxide through a conversion zone and there contacting the gaseous mixture at a temperature in the vicinity of 1700° F., first with a catalytic metal capable of reacting with the sulphur compounds in the gases to form a metallic sulphide having a melting point higher than the temperature of the gaseous mixture, and then with a nickel catalyst, both catalysts promoting the formation of hydrogen and carbon monoxide, and the sulphur removal catalyst contacting step being of sufficient duration to substantially remove sulphur and sulphur containing compounds from the incoming gas.

3. A method of converting methane, carbon dioxide and steam into hydrogen and carbon monoxide including the steps of flowing a mixture of methane and carbon dioxide through a conversion zone and there contacting the gaseous mixture at a temperature in the vicinity of 1700° F., first with a cobalt catalyst having an affinity for the sulphur compounds in the gases, and then with a nickel catalyst, both catalysts promoting the formation of hydrogen and carbon monoxide, and the cobalt catalyst contacting step being of sufficient duration to substantially remove sulphur and sulphur containing compounds from the incoming gas.

4. A method of converting a sulphur-bearing mixture of methane and at least one gas selected from the group consisting of carbon dioxide and steam into hydrogen and carbon monoxide including the steps of passing the mixture at a temperature of about 1700° F. first into contact with a cobalt catalyst and then with a nickel catalyst, whereby substantially all the sulphur in the mixture combines with the cobalt catalyst to form cobalt sulphide and the desired conversion is brought about by the action of both catalysts, discontinuing the passage of the mixture into contact with the catalyst before all the cobalt has combined with sulphur and reacting the cobalt sulphide with an oxidizing gas to produce cobalt oxide and sulphur oxide, reacting the cobalt oxide with a reducing gas to reform metallic cobalt, resuming the passage of the mixture into contact with the catalysts, and continuously repeating said cycle of steps.

5. In a process for the conversion of a sulphur-containing gaseous mixture comprising methane and at least one gas selected from the group consisting of carbon dioxide and steam in the presence of a contact mass including a nickel catalyst into a synthesis gas comprising hydrogen and carbon monoxide, by a procedure involving a heat-regenerative cycle wherein the contact mass is heated to an elevated temperature lying within the upper part of the temperature range suitable for the reaction and a conversion cycle wherein a sufficient quantity of said gaseous mixture is converted by passing it over the contact mass to lower the temperature of the contact mass to a degree insufficient for the required conversion, the improvement which consists in passing said gaseous mixture in the conversion cycle initially through a cobalt catalyst containing cobalt in an amount sufficient to combine with substantially all the sulphur present in the quantity of gas passed over the contact mass during the conversion cycle.

EARL W. RIBLETT.